United States Patent
Peter (10) Patent No.: US 12,131,066 B2
(45) Date of Patent: Oct. 29, 2024

(54) EFFICIENT COMMAND FETCHING IN A MEMORY SUB-SYSTEM

(71) Applicant: Micron Technology, Inc., Boise, ID (US)

(72) Inventor: Eldhose Peter, Bengaluru (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/845,310

(22) Filed: Jun. 21, 2022

(65) Prior Publication Data

US 2023/0409239 A1    Dec. 21, 2023

(51) Int. Cl.
  *G06F 12/00*   (2006.01)
  *G06F 3/06*    (2006.01)
  *G06F 13/00*   (2006.01)

(52) U.S. Cl.
  CPC .......... *G06F 3/0659* (2013.01); *G06F 3/0604* (2013.01); *G06F 3/0679* (2013.01)

(58) Field of Classification Search
  CPC ..... G06F 3/0659; G06F 3/0604; G06F 3/0679
  USPC .......................................................... 711/154
  See application file for complete search history.

(56) References Cited

U.S. PATENT DOCUMENTS

| | | | | |
|---|---|---|---|---|
| 4,570,217 A * | 2/1986 | Allen | .................... | G06F 9/4825 700/83 |
| 5,561,456 A * | 10/1996 | Yu | ..................... | H04N 7/17327 725/91 |
| 6,104,392 A * | 8/2000 | Shaw | ........................ | H04L 9/40 715/749 |
| 6,260,099 B1 * | 7/2001 | Gilbertson | .......... | G06F 13/1657 710/39 |
| 6,304,906 B1 * | 10/2001 | Bhatti | ................... | H04L 47/808 709/227 |
| 6,362,836 B1 * | 3/2002 | Shaw | .................... | H04L 67/303 715/744 |
| 6,401,147 B1 * | 6/2002 | Sang | ................... | H04L 47/6215 710/14 |
| 6,452,693 B1 * | 9/2002 | Isoda | ................ | H04L 12/40123 358/1.15 |
| 6,466,326 B1 * | 10/2002 | Shima | ..................... | G06F 3/126 358/1.12 |
| 7,451,264 B2 * | 11/2008 | Yero | .................... | G06F 12/0246 711/E12.008 |
| 7,467,253 B2 * | 12/2008 | Yero | .................... | G06F 12/0246 711/E12.008 |
| 7,533,154 B1 * | 5/2009 | Chen | ....................... | H04L 49/90 709/213 |

(Continued)

*Primary Examiner* — Sheng Jen Tsai
(74) *Attorney, Agent, or Firm* — Lowenstein Sandler LLP (57) ABSTRACT

A request to perform a memory access operation at a zone of a memory device is received from a host system. An identifier of the memory access operation is stored in a first queue of the memory device. A plane set that is associated, by a memory data structure, with the zone of the memory device is identified among a plurality of plane sets of the memory device. Responsive to retrieving the identifier of the memory access operation from the first queue, the identifier of the memory access operation is stored in a second queue of the memory device, wherein the second queue corresponds to the identified plane set. Responsive to retrieving the identifier of the memory access operation from the second queue, the memory access operation is performed at the zone of the memory device.

20 Claims, 7 Drawing Sheets

(56) References Cited

U.S. PATENT DOCUMENTS

| | | | | |
|---|---|---|---|---|
| 11,586,385 B1* | 2/2023 | Lercari | | G06F 12/0246 |
| 11,681,614 B1* | 6/2023 | Kuzmin | | G06F 16/1847 |
| | | | | 710/301 |
| 11,789,612 B2* | 10/2023 | Inbar | | G06F 3/0679 |
| | | | | 711/3 |
| 2002/0085574 A1* | 7/2002 | Kerr | | H04L 47/621 |
| | | | | 370/429 |
| 2002/0087709 A1* | 7/2002 | Kerr | | H04L 9/40 |
| | | | | 709/240 |
| 2002/0099729 A1* | 7/2002 | Chandrasekaran | | |
| | | | | G06F 11/1471 |
| | | | | 707/999.203 |
| 2003/0055327 A1* | 3/2003 | Shaw | | H04L 67/62 |
| | | | | 600/407 |
| 2004/0100900 A1* | 5/2004 | Lines | | G06F 13/4247 |
| | | | | 370/229 |
| 2011/0178983 A1* | 7/2011 | Bernhard | | G06F 11/08 |
| | | | | 707/610 |
| 2011/0185293 A1* | 7/2011 | Barnett | | G06F 3/048 |
| | | | | 709/224 |
| 2013/0128666 A1* | 5/2013 | Avila | | G11C 11/5642 |
| | | | | 365/185.11 |
| 2015/0227543 A1* | 8/2015 | Venkatesh | | G06F 16/119 |
| | | | | 707/620 |
| 2015/0381725 A1* | 12/2015 | Haapaoja | | G06F 3/067 |
| | | | | 709/213 |
| 2016/0004720 A1* | 1/2016 | Tabaaloute | | G06F 16/289 |
| | | | | 707/639 |
| 2018/0275872 A1* | 9/2018 | Benisty | | G06F 13/24 |
| 2018/0275920 A1* | 9/2018 | Koo | | G06F 3/0659 |
| 2018/0373708 A1* | 12/2018 | Martin | | G06F 16/2282 |
| 2019/0042327 A1* | 2/2019 | Qi | | G06F 9/5083 |
| 2019/0066035 A1* | 2/2019 | Hance | | G05D 1/021 |
| 2020/0050395 A1* | 2/2020 | Bavishi | | G06F 3/0611 |
| 2020/0057582 A1* | 2/2020 | Shin | | G06F 3/061 |
| 2021/0042233 A1* | 2/2021 | Lee | | G06F 3/0659 |
| 2021/0314370 A1* | 10/2021 | Candello | | H04L 51/046 |
| 2021/0389879 A1* | 12/2021 | Inbar | | G06F 3/0656 |
| 2021/0389904 A1* | 12/2021 | Lee | | G06F 3/0659 |
| 2022/0057953 A1* | 2/2022 | Lee | | G06F 3/0659 |
| 2022/0058141 A1* | 2/2022 | Magro | | G06F 12/1009 |
| 2022/0166666 A1* | 5/2022 | Jain | | H04L 41/0663 |

* cited by examiner

EFFICIENT COMMAND FETCHING IN A MEMORY SUB-SYSTEM

TECHNICAL FIELD

Embodiments of the disclosure relate generally to memory sub-systems, and more specifically, relate to efficient command fetching in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to efficient command fetching in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can include one or more memory planes ("planes"). For some types of non-volatile memory devices (e.g., NAND devices), each plane includes a set of physical blocks ("blocks"). Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values. A block refers to a unit of the memory device used to store data and can include a group of memory cells, a word line group, a word line, or individual memory cells.

Data operations (also referred to as "memory access operations") can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data in the memory device at the memory sub-system and to read data from the memory device of the memory sub-system.

The data to be read or written, as specified by a host request, is referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), and the like. For simplicity, where "data" is referred to hereafter, such data can be understood to refer to at least host data, but can also refer to other data such as media management data and/or system data.

The cells (or simply "media") of memory devices can be organized hierarchically from die (upper level), to plane, to block, to page (lower level). A block set (also referred to as a block stripe) can be a set of blocks arranged across planes of different dies, such that the blocks are grouped together for purposes of data storage. Multiple blocks of one or more block sets can be identified as a data group. Writing to block stripes allows more host data to be concurrently written and read at the same time across multiple dies, increasing the quality of service (QoS) and performance of the memory device.

In certain memory devices, data can be written to groups of memory cells that are also referred to as zones for simplicity, where each zone can be mapped to multiple blocks of data. Thus, mappings can be recorded at a higher granularity (megabytes instead of kilobytes) in order to map a particular data group as a zone in the LBA space, which significantly reduces metadata that is logged. The mapping space associated with the LBA space at this granularity can be referred to as a zoned namespace (ZNS). In certain memory devices, each zone can be mapped to a block stripe. However, in some examples, certain memory devices can have a requirement where a smaller zone size is required, i.e., the zone maps to a certain number of blocks within a single die (referred to as a "block set") rather than across multiple dice. In certain memory devices, a block set can be formed with a predefined number (e.g., two) blocks. A single die can have a predefined number (e.g., four) blocks. Thus, each die can include multiple zones. Typically, writing to a zone is performed sequentially. Writing to zones that are mapped to block sets instead of block stripes, however, does not allow for host data to be concurrently written and read at the same time across multiple dice (i.e., achieve maximum parallelism). Rather, a read command to one zone and a write command to another zone can fall within a single die since there are multiple zones within each die. Since only one command can be performed at a time within a die, a memory device that implements smaller zones that map to block sets will fail to achieve maximum parallelism across multiple dice of the memory device.

In some memory devices implementing smaller zone sizes, the memory devices perform memory access operations received from a host system using a round-robin algorithm. In such memory devices, each read and/or write command is placed into a queue. The queue can be one of a set of queues, where each queue can hold a maximum number of memory access operations based on the physical characteristics and storage capacity of the memory device. The memory sub-system controller can fetch a command from each queue in a round-robin fashion, e.g., a first command is fetched from queue "0", a second command is fetched from queue "1", a third command is fetched from queue "2", etc. However, as discussed above, since the zone sizes are smaller and can thus fall within a single die, fetching commands from separate queues can still include commands that are to be performed on the same die. For example, the first command fetched from queue "0" can correspond to a zone in die 0, while the second command fetched from queue "1" can correspond to another zone within die 0. Thus, the memory device cannot concurrently perform the first and second commands concurrently and achieve parallelism across the die of the memory device. Instead, each command is performed separately.

Aspects of the present disclosure address the above and other deficiencies by implementing a memory sub-system that provides efficient command fetching. In contrast to using the round robin algorithm, which does not address maximum parallelism as described above, a memory sub-system controller can also include a zone-to-plane set mapping table. The zone to plane set mapping table can include fixed mappings of each zone to a corresponding plane set in the memory device. The plane set can include one or more planes on which a zone resides. In some embodiments, the plane set includes a fixed number of planes, e.g., 2 planes, on which the zone resides. The fixed number of planes on which the zone resides can be logically grouped together as a "plane set." Once the memory sub-system controller retrieves a command from the above-described set of queues in a round-robin fashion, the memory sub-system controller can identify the zone to plane set mapping for the command using the zone to plane set mapping table. The retrieved command can include metadata that includes an identifier of the command and an identifier of the zone at which the command is to be performed. The memory sub-system controller can identify an entry in the zone to plane set mapping table that stores the identifier of the zone for the command. In response to identifying the entry in the zone to plane set mapping table that stores the identifier of the zone for the command, the memory sub-system controller can identify the plane set referenced by the entry. The memory sub-system controller can further maintain another set of queues, where each queue corresponds to a plane set of the memory device, i.e., each queue stores the memory access operations to be performed on a zone residing on a particular plane set of the memory device. In response to identifying the plane set for the command retrieved from the first queue, the memory sub-system controller can identify the queue corresponding to the identified plane set. If the number of commands currently stored in the identified queue satisfies a threshold criterion (e.g., is less than a threshold value reflecting a maximum number of commands to be stored in the plane set queue), the memory sub-system controller can remove the identifier of the command from the first set of queues and store the identifier of the command in the plane set queue. If the number of commands currently stored in the identified queue does not satisfy the threshold criterion (e.g., is greater than or equal to the threshold value), the memory sub-system controller can leave the current command in the first queue and retrieve the next command in the first queue. If the next command corresponds to the same identified plane set, the memory sub-system controller leaves the next command in the first queue. The memory sub-system controller retrieves the subsequent command in the first queue. If the subsequent command corresponds to another plane set, the memory sub-system controller stores the identifier of the subsequent command in another queue, where the queue includes identifiers of commands that are each to be performed at a zone residing on the second plane set. The memory sub-system controller can retrieve the identifier of the memory access operation stored at the second plane set and perform the memory access operation at the corresponding zone of the memory device.

Advantages of the present disclosure include, but are not limited to achieving maximum parallelism across the dice of a memory device. The memory sub-system controller can avoid only performing memory access operations that fall within the same plane set (e.g., on the same die of the memory device). Instead, the memory sub-system controller can identify the zone to plane set mapping for each memory access operations. The memory sub-system controller can store the memory access operations that are to be performed on a particular plane set in a queue that only stores memory access operations that are to be performed on that particular plane set. Once the number of memory access operations in the queue corresponding to that particular plane set queue reaches the threshold value, the memory sub-system controller can fetch memory access operations that fall within another plane set, thus avoiding instances where memory access operations that only fall within a particular die are performed. Instead, fetching memory access operations that fall within another plane set can allow for there to be concurrent memory access operations on more than one die of the memory device. Accordingly, the overall QoS and performance of the memory sub-system can be improved.

Figure 1:
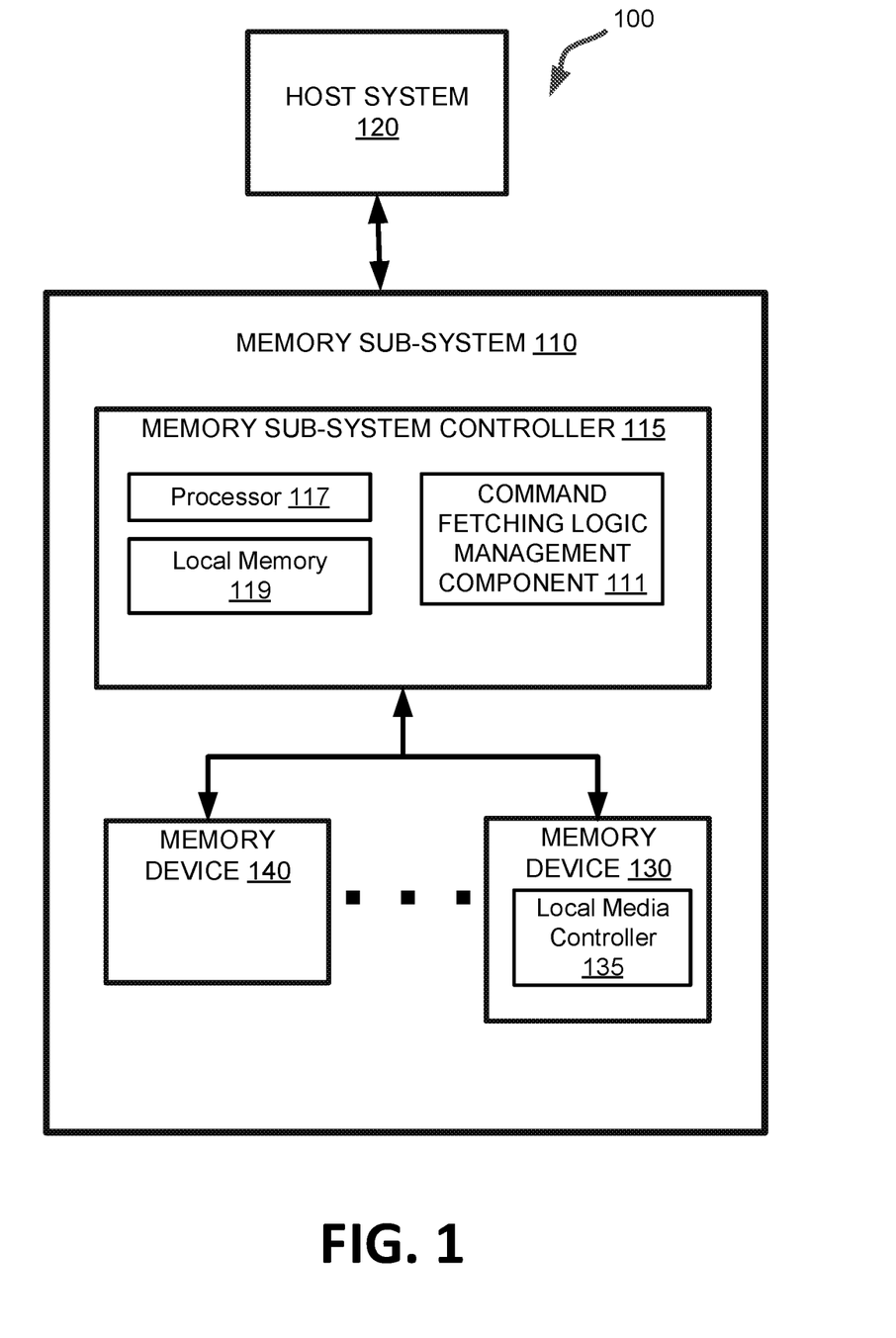
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO- DIMM), and various types of non-volatile dual in-line memory modules (NVDEVIMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a command fetching logic management component 111 that provides efficient command fetching for the memory sub-system 110. In some embodiments, the memory sub-system controller 115 includes at least a portion of the command fetching logic management component 111. In some embodiments, the command fetching logic management component 111 is part of the host system 110, an application, or an operating system. In other embodiments, local media controller 135 includes at least a portion of the command fetching logic management component 111 and is configured to perform the functionality described herein.

The command fetching logic management component 111 can receive a request to perform a memory access operation at a zone of a memory device. In some embodiments, the command fetching logic management component 111 can store an identifier of the memory access operation in a queue. The queue can be one of a set of queues, where each queue stores a maximum number of memory access operations. The maximum number of memory access operations can be a pre-determined or dynamic number based, e.g., on the design and/or physical characteristics of the memory device. In some embodiments, the command fetching logic management component 111 can identify a zone to plane set mapping for the memory access operation using a zone to plane set mapping table. The command fetching logic management component 111 can identify an entry in the zone to plane set mapping table that stores an identifier of the zone at which the memory access operation is to be performed. In response to identifying the entry in the zone to plane set mapping table that stores the identifier of the zone, the command fetching logic management component 111 can identify the plane set referenced by the entry. The command fetching logic management component 111 can further maintain another set of queues, where each queue corresponds to a plane set of the memory device, i.e., each queue stores the memory access operations to be performed on a zone residing on a particular plane set of the memory device. In response to identifying the plane set for the memory access operation retrieved from the first queue, the command fetching logic management component 111 can identify the queue corresponding to the identified plane set. If the number of memory access operations currently stored in the identified queue satisfies a threshold criterion (e.g., is less than a threshold value reflecting a maximum number of commands to be stored in the plane set queue), the command fetching logic management component 111 can remove the identifier of the memory access operation from the first set of queues and store the identifier of the command in the plane set queue. If the number of memory access operations currently stored in the identified queue does not satisfy the threshold criterion (e.g., is greater than or equal to the threshold value), the command fetching logic management component 111 can leave the current memory access operation in the first queue and retrieve the next memory access operation in the first queue. If the next memory access operation corresponds to the same identified plane set, the command fetching logic management component 111 leaves the next memory access operation in the first queue. The command fetching logic management component 111 retrieves the subsequent memory access operation in the first queue. If the subsequent memory access operation corresponds to another plane set, the command fetching logic management component 111 stores the identifier of the subsequent memory access operation in another queue, where the queue includes identifiers of memory access operations that are each to be performed at a zone residing on the second plane set. The command fetching logic management component 111 can retrieve the identifier of the memory access operation stored at the second plane set and perform the memory access operation at the corresponding zone of the memory device.

Further details with regards to the operations of the command fetching logic management component 111 are described below.

Figure 2A:
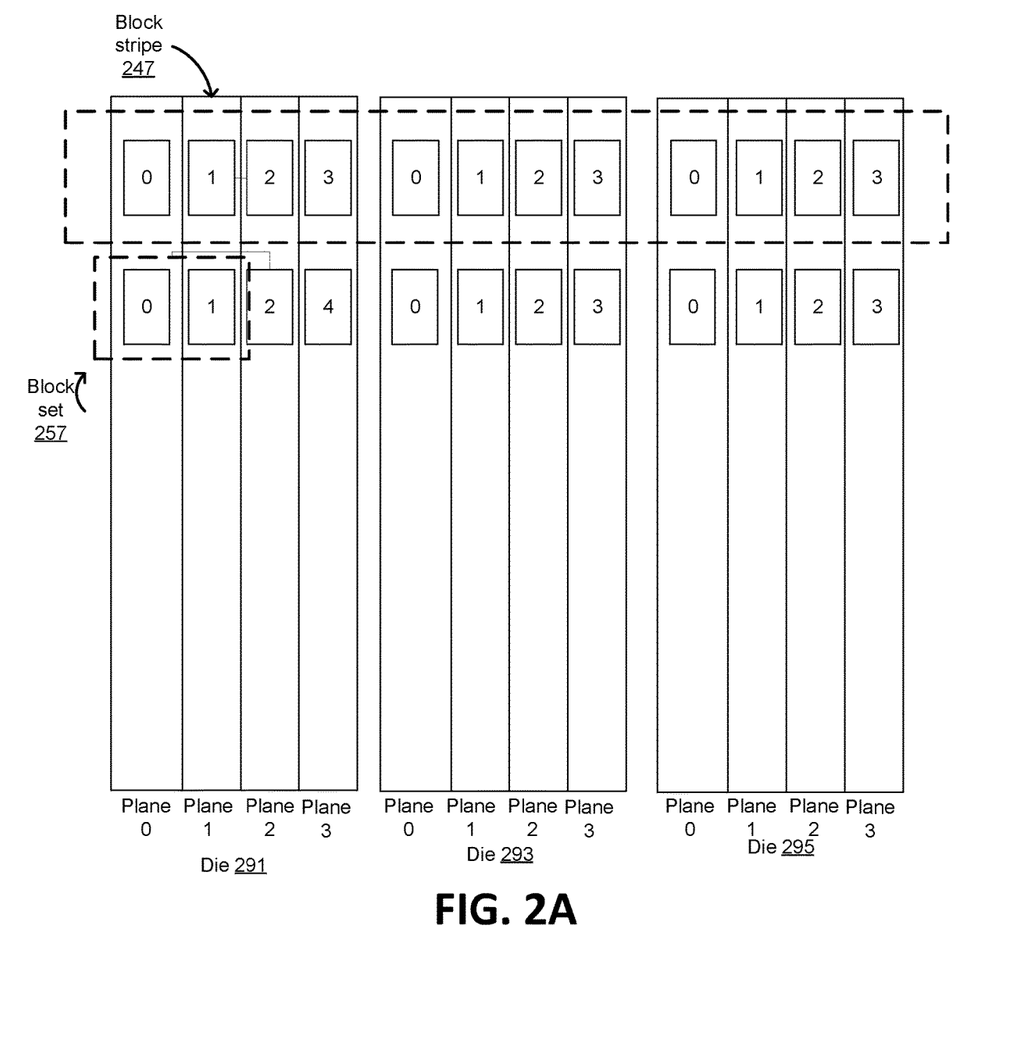
FIG. 2A is a diagram illustrating an example of a block stripe and a block set within dice of a memory device in accordance with some embodiments of the present disclosure.

FIG. 2A is a diagram illustrating an example of a block stripe and a block set within dice of a memory device, in accordance with some embodiments of the present disclosure. As illustrated in FIG. 2A, a memory device can include multiple blocks (e.g., 0, 1, 2, 3) across multiple die (e.g., die 291, die 293, and die 295). Each die can include a set of planes. For example, die 291 can include plane 0, plane 1, plane 2, and plane 3. Die 293 can include plane 0, plane 1, plane 2, and plane 3. Die 295 can include plane 0, plane 1, plane 2, and plane 3. As illustrated in FIG. 2A, certain memory devices can group blocks into a block stripe (e.g., a block stripe 247) that is across multiple dice. For example, the block stripe 247 can include blocks 0, 1, 2, and 3 from die 291, blocks 0, 1, 2, and 3 from die 293, and blocks 0, 1, 2, and 3 from die 295. As illustrated in FIG. 2A, certain memory devices can group blocks into a block set (e.g., a block set 257) that is within a single die. For example, the block set 257 can include blocks 0 and 1 from die 291. In some embodiments, a plane set can include the planes on which a block set resides. For example, a plane set for the block set 257 can include plane 0 and plane 1.

Figure 2B:
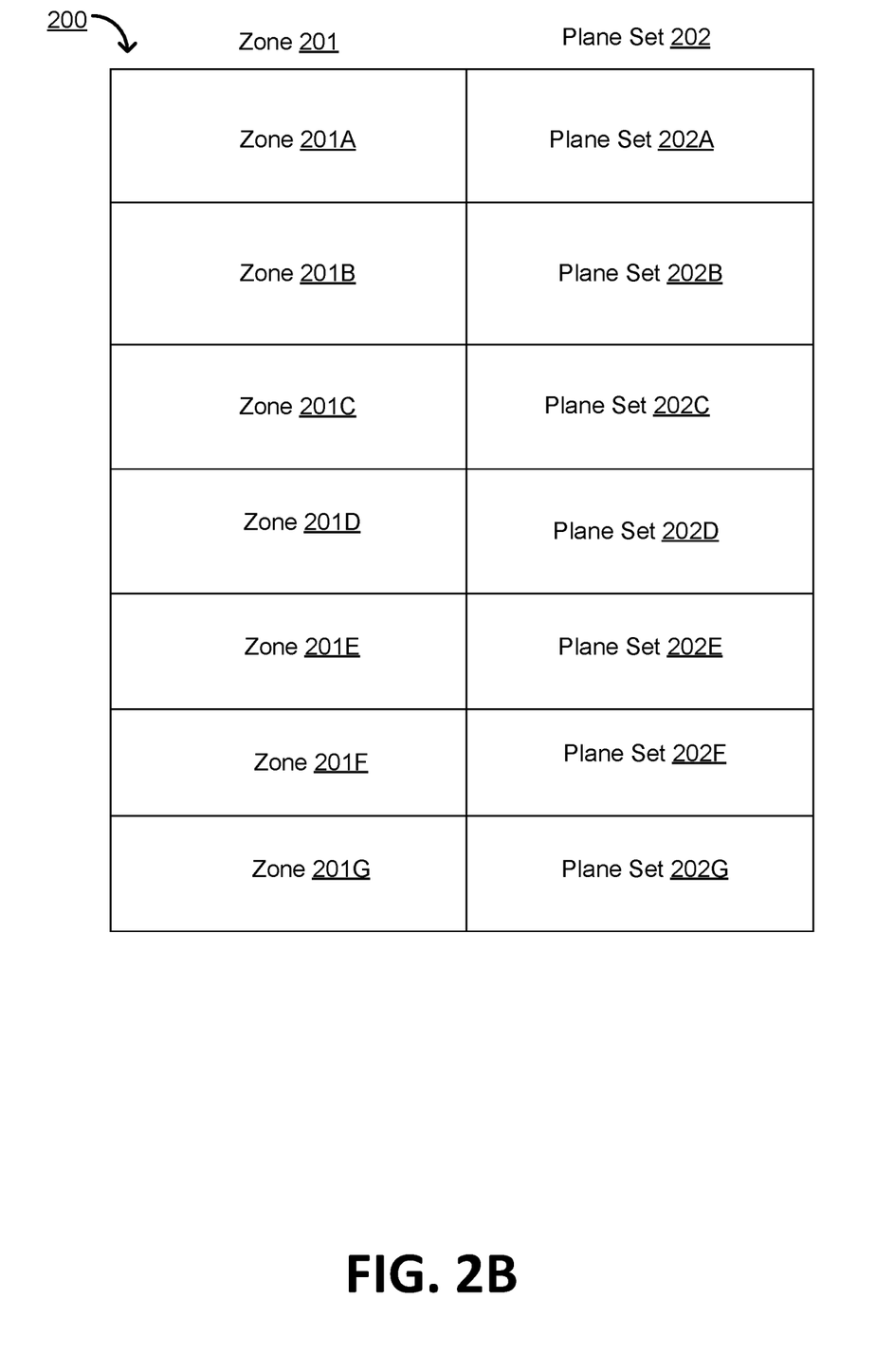
FIG. 2B is a diagram illustrating an example of a zone mapping data structure in accordance with some embodiments of the present disclosure.

FIG. 2B is a diagram illustrating an example of a zone-to-plane set mapping data structure in accordance with some embodiments of the present disclosure. As illustrated in FIG. 2B, a memory device can include a zone-to-plane set mapping data structure 200 that maps each zone of the memory device to a plane set. Each plane set includes a fixed number of planes on which each zone resides. In the zone-to-plane set mapping data structure 200, zone 201A maps to plane set 202A, zone 201B maps to plane set 202B, zone 201C maps to plane set 202C, zone 201D maps to plane set 202D, zone 201E maps to plane set 202E, zone 201F maps to plane set 202F, and zone 201G maps to plane set 202G.

Figure 2C:
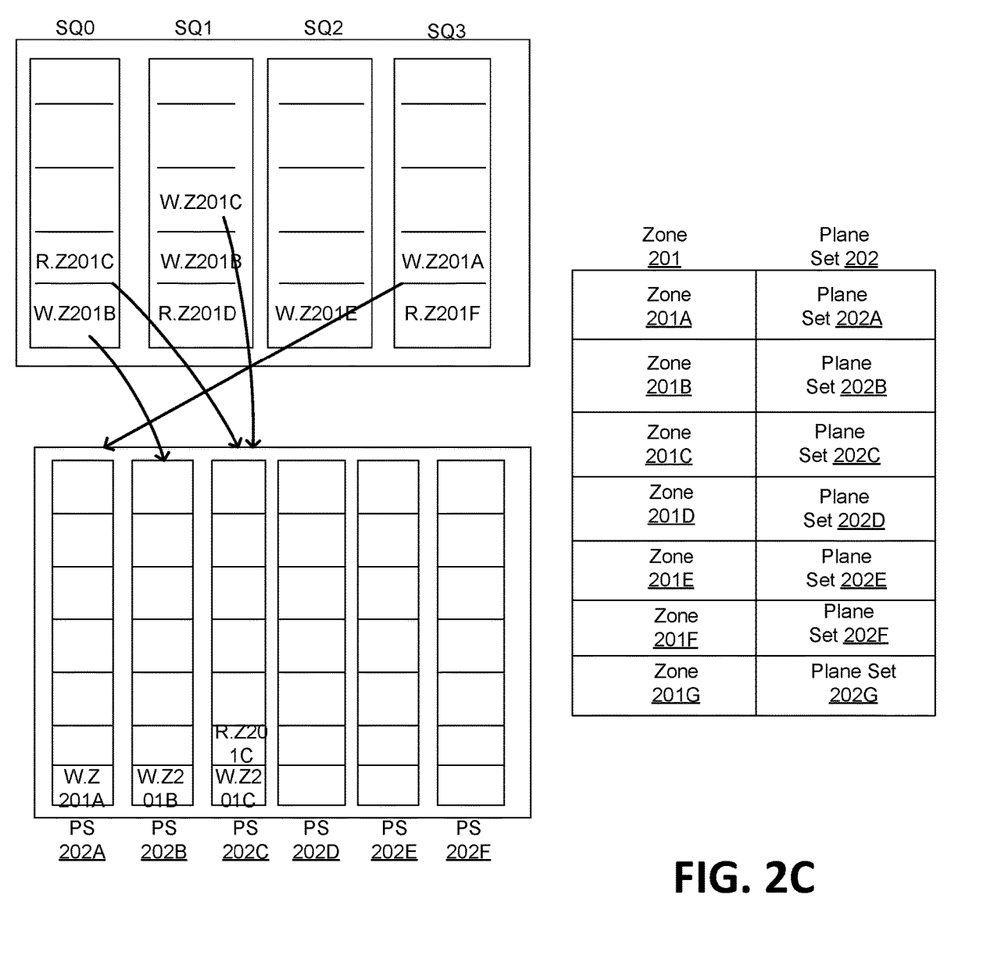
FIG. 2C is a diagram illustrating an example of a device mapping logic in accordance with some embodiments of the present disclosure.

FIG. 2C is a diagram illustrating an example of a device mapping logic in accordance with some embodiments of the present disclosure. As illustrated in FIG. 2C, a write command and/or read command can be first stored (i.e., an identifier of the write and/or read command can be stored) in a queue. For example, R.Z201C (i.e., read command to zone 201C) can be stored in queue SQ0. W.Z201B (i.e., write command to zone 201B) can be stored in queue SQ0. W.Z201C (i.e., write command to zone 201C) can be stored in queue SQ1. W.Z201B (i.e., write command to zone 201B) can be stored in queue SQ1. R.Z201D (i.e., read command to zone 201D) can be stored in queue SQ1. W.Z01E (i.e., write command to zone 201E) can be stored in queue SQ2. W.Z201A (i.e., write command to zone 201A) can be stored in queue SQ3. R.Z201F (i.e., read command to zone 201F) can be stored in queue SQ3. As discussed herein, in order to allow for maximum parallelism across multiple dice, a zone-to-plane set mapping data structure (e.g., the zone-to-plane set mapping data structure 200 of FIG. 2B) can be used to identify a zone to plane set mapping for each memory access command that is requested to be performed at a particular zone. Once the zone to plane set mapping is identified, the memory access command can be stored in another queue that corresponds to the identified plane set mapping for the particular zone to which the memory access command is to be performed. For example, R.Z201C (i.e., read command to zone 201C) is stored in queue S10. A memory sub-system controller can identify the zone to plane set mapping using the zone-to-plane set mapping data structure 200. The zone-to-plane set mapping data structure 200 identifies that the R.Z201C command is to be performed at zone 201C. Based on the zone-to-plane set mapping data structure 200, zone 201C is mapped to plane set 202C. As discussed in more details herein below, the R.Z201C command can be retrieved from the queue SQ0 and stored in a queue corresponding to plane set 202C. Further details are described herein below with respect to FIGS. 3-4.

Figure 3:
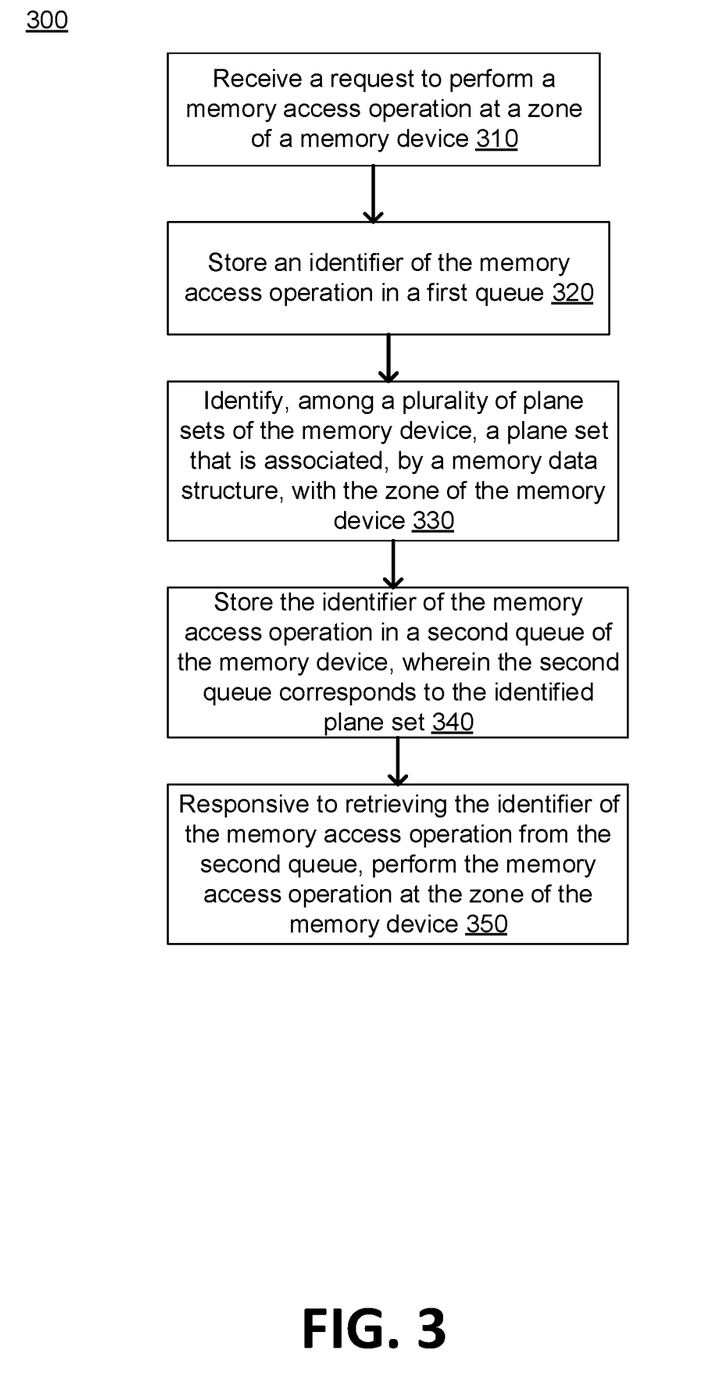
FIG. 3 is a flow diagram of an example method for efficient command fetching in a memory sub-system in accordance with some embodiments of the present disclosure.

FIG. 3 is a flow diagram of an example method 300 for efficient command fetching in a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the command fetching logic management component 111 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives a request to perform a memory access operation (e.g., a read command or write command) at a zone of the memory device. In some embodiments, the processing logic receives the request from a host system (e.g., the host system 120 of FIG. 1). In some embodiments, the processing logic receives a zone identifier with the request to perform the memory access operation. The zone identifier can be associated with (i.e., can identify) a zone at which the memory access operation is to be performed. In some embodiments, the request to perform the memory access operation can include metadata. The metadata can include an identifier of the memory access operation. In some embodiments, the processing logic can identify the zone identifier associated with the zone at which the memory access operation is to be performed by identifying the LBA associated with the memory access operation. The LBA can be included in the metadata. The LBA can reference the blocks on which the memory access operation is to be performed.

At operation 320, the processing logic stores the identifier of the memory access operation in a queue. In some embodiments, the queue can be a queue of a set of queues. Each queue can have one or more entries. Each entry can store an identifier of a memory access operation. Each queue can store a maximum number of memory access operations (e.g., each queue can have a maximum number of entries). The maximum number of memory access operations can be a pre-determined or dynamic number based, e.g., on the design and/or physical characteristics of the memory device. In some embodiments, the queue can be a queue SQ0, SQ1, SQ2, or SQ3 as illustrated in FIG. 2C. In some embodiments, the processing logic can store the identifier of the memory access operation in an entry of the queue.

At operation 330, the processing logic identifies a plane set. The plane set can be a plane set of a set of plane sets. Each plane set can include a fixed number of planes that are in a particular zone of the memory device. For example, as illustrated in FIG. 2A, a plane set can include plane 0 and plane 1, where block set 257 resides. Block set 257 can be in zone 0 of the memory device. In some embodiments, the processing logic identifies the plane set that includes the planes on which the zone at which the received memory access operation is to be performed. In some embodiments, the processing logic identifies the plane set based on a zone-plane set mapping table (e.g., the zone mapping table structure 200 illustrated in FIG. 2B). In some embodiments, the mapping table can include one or more entries. Each entry can include a mapping of a zone identifier to a plane set of the memory device.

At operation 340, the processing logic stores the identifier of the memory access operation in another queue. The queue can be part of another set of queues of the memory device. Each queue can correspond to a different plane set of the memory device. Each entry can store an identifier of a memory access operation to be performed in a zone mapped to a plane set corresponding to the queue. Each queue can store a maximum number of memory access operations (e.g., each queue can have a maximum number of entries). The maximum number of memory access operations can be a pre-determined or dynamic number based, e.g., on the design and/or physical characteristics of the memory device. In some embodiments, each queue can be a queue PS202A, PS202B, PS202C, PS202D, PS202E, or PS202F, as illustrated in FIG. 2C. In some embodiments, the processing logic can store the identifier of the memory access operation in the queue based on identifying the mapping of the zone at which the memory access operation is to be performed and the corresponding plane set. For example, as illustrated in FIG. 2C, the memory access operation can be W.Z201A (e.g., a write command to zone 201A). As illustrated in the zone mapping table structure 200, zone 201A maps to plane set 202A. Thus, a processing logic can store the identifier of the W.Z201A command in the queue corresponding to plane set 202A, i.e., queue PS202A. In some embodiments, the processing logic stores the identifier of the memory access command in the queue in response to retrieving the identifier of the memory access command from the queue described at operation 320. In some embodiments, the processing logic can retrieve the identifier of the memory access command from the queue described at operation 320 in response to identifying a number of identifiers of memory access operations stored in the queue described at operation 340 (e.g., a queue corresponding to a plane set). Identifying the number of identifiers of memory access operations stored in the queue can include incrementing a counter for each entry in the queue that stores an identifier of a memory access operation. The processing logic can determine that the number of identifiers of memory access operations satisfies a threshold criterion. In some embodiments, determining that the number of identifiers of memory access operations satisfies the threshold criterion can include identifying that the counter is less than the threshold criterion (e.g., a threshold value that reflects a maximum number of identifiers of memory access operations that can be stored in the queue described at operation 340). In some embodiments, in response to determining that the number of identifiers of memory access operations satisfies the threshold criterion, the processing logic can retrieve the identifier of the memory access command from the queue described at operation 320 and store the identifier of the memory access operation in the other queue described at operation 340. In some embodiments, in response the determining that the number of identifiers of memory access operations does not satisfy the threshold criterion (e.g., the counter is greater than or equal to the threshold value), the processing logic can retrieve another identifier of another memory access command from the queue described at operation 320 and store the identifier of the memory access operation in a second queue of the set of the queues described at operation 320 that correspond to plane sets. For example, as illustrated in FIG. 2C, instead of storing the identifier of the memory access operation in the queue PS202A, the processing logic can store another identifier of another memory access operation in the queue PS202B, i.e., another queue that corresponds to another plane set (i.e., plane set 202B).

At operation 350, the processing logic performs the memory access operation. In some embodiments, performing the memory access operation can be in response to retrieving the identifier of the memory access operation from the queue described at operation 340. Performing the memory access operation can include performing the memory access operation at the zone identified by the memory access operation request.

In some embodiments, the operations performed at operations 310 to 350 are performed using a hardware accelerator.

Figure 4:
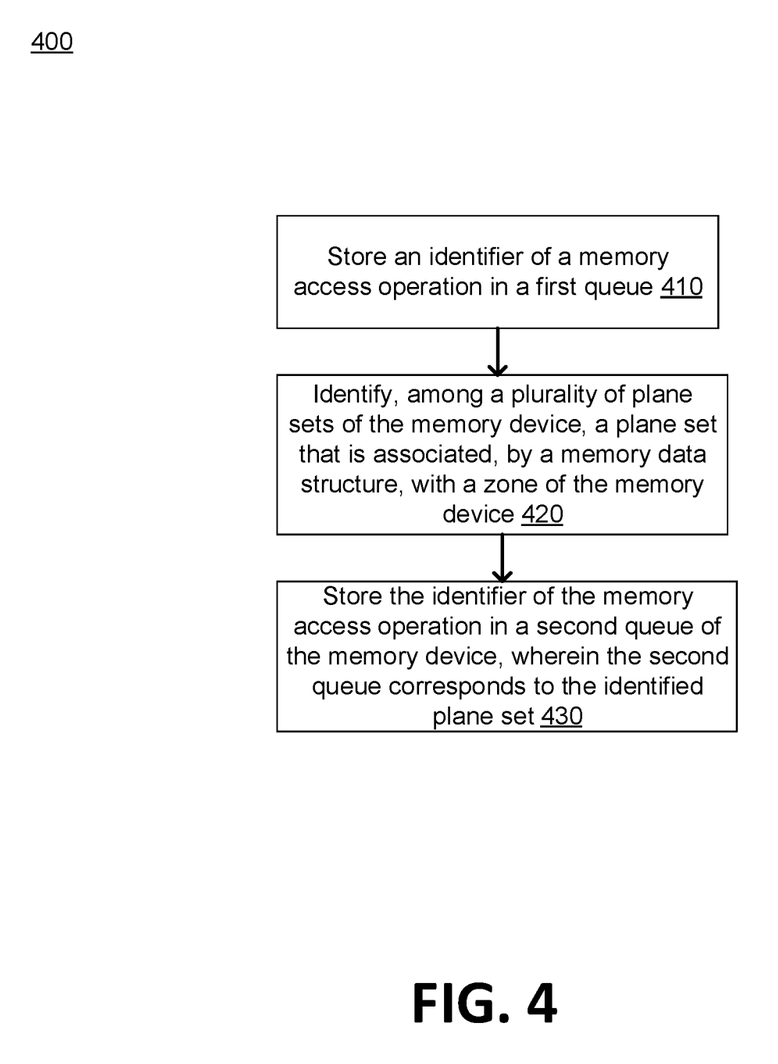
FIG. 4 is a flow diagram of an example method for efficient command fetching in a memory sub-system in accordance with some embodiments of the present disclosure.

FIG. 4 is a flow diagram of an example method 400 for efficient command fetching in a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the command fetching logic management component 111 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic stores an identifier of a memory access operation in a queue of the memory device. In some embodiments, the queue can be a queue of a set of queues. Each queue can have one or more entries. Each entry can store an identifier of a memory access operation. Each queue can store a maximum number of memory access operations (e.g., each queue can have a maximum number of entries). The maximum number of memory access operations can be a pre-determined or dynamic number based, e.g., on the design and/or physical characteristics of the memory device. In some embodiments, the queue can be a queue SQ0, SQ1, SQ2, or SQ3 as illustrated in FIG. 2C. In some embodiments, the processing logic stores the identifier in response to receiving a request to perform the memory access operation (e.g., a read command or write command) at a zone of the memory device. In some embodiments, the processing logic receives the request from a host system (e.g., the host system 120 of FIG. 1). In some embodiments, the processing logic receives a zone identifier with the request to perform the memory access operation. The zone identifier can be associated with (i.e., can identify) a zone at which the memory access operation is to be performed. In some embodiments, the request to perform the memory access operation can include metadata. The metadata can include an identifier of the memory access operation. In some embodiments, the processing logic can identify the zone identifier associated with the zone at which the memory access operation is to be performed by identifying the LBA associated with the memory access operation. The LBA can be included in the metadata. The LBA can reference the blocks on which the memory access operation is to be performed.

At operation 420, the processing logic identifies a plane set. The plane set can be a plane set of a set of plane sets. Each plane set can include a fixed number of planes that are in a particular zone of the memory device. For example, as illustrated in FIG. 2A, a plane set can include plane 0 and plane 1, where block set 257 resides. Block set 257 can be in zone 0 of the memory device. In some embodiments, the processing logic identifies the plane set that includes the planes on which the zone at which the received memory access operation is to be performed. In some embodiments, the processing logic identifies the plane set based on a zone-plane set mapping table (e.g., the zone mapping table structure 200 illustrated in FIG. 2B). In some embodiments, the mapping table can include one or more entries. Each entry can include a mapping of a zone identifier to a plane set of the memory device.

At operation 430, the processing logic stores the identifier of the memory access operation in another queue. The queue can be part of another set of queues of the memory device. Each queue can correspond to a different plane set of the memory device. Each entry can store an identifier of a memory access operation to be performed in a zone mapped to a plane set corresponding to the queue. Each queue can store a maximum number of memory access operations (e.g., each queue can have a maximum number of entries). The maximum number of memory access operations can be a pre-determined or dynamic number based, e.g., on the design and/or physical characteristics of the memory device. In some embodiments, each queue can be a queue PS202A, PS202B, PS202C, PS202D, PS202E, or PS202F, as illustrated in FIG. 2C. In some embodiments, the processing logic can store the identifier of the memory access operation in the queue based on identifying the mapping of the zone at which the memory access operation is to be performed and the corresponding plane set. For example, as illustrated in FIG. 2C, the memory access operation can be W.Z201A (e.g., a write command to zone 201A). As illustrated in the zone mapping table structure 200, zone 201A maps to plane set 202A. Thus, a processing logic can store the identifier of the W.Z201A command in the queue corresponding to plane set 202A, i.e., queue PS202A. In some embodiments, the processing logic stores the identifier of the memory access command in the queue in response to retrieving the identifier of the memory access command from the queue described at operation 410. In some embodiments, the processing logic can retrieve the identifier of the memory access command from the queue described at operation 410 in response to identifying a number of identifiers of memory access operations stored in the queue described at operation 420 (e.g., a queue corresponding to a plane set). Identifying the number of identifiers of memory access operations stored in the queue can include incrementing a counter for each entry in the queue that stores an identifier of a memory access operation. The processing logic can determine that the number of identifiers of memory access operations satisfies a threshold criterion. In some embodiments, determining that the number of identifiers of memory access operations satisfies the threshold criterion can include identifying that the counter is less than the threshold criterion (e.g., a threshold value that reflects a maximum number of identifiers of memory access operations that can be stored in the queue described at operation 430). In some embodiments, in response to determining that the number of identifiers of memory access operations satisfies the threshold criterion, the processing logic can retrieve another identifier of another memory access command from the queue described at operation 410 and store the identifier of the memory access operation in the other queue described at operation 430. In some embodiments, in response the determining that the number of identifiers of memory access operations does not satisfy the threshold criterion (e.g., the counter is greater than or equal to the threshold value), the processing logic can retrieve the identifier of the memory access command from the queue described at operation 410 and store the identifier of the memory access operation in a second queue of the set of the queues described at operation 410 that correspond to plane sets. For example, as illustrated in FIG. 2C, instead of storing the identifier of the memory access operation in the queue PS202A, the processing logic can store another identifier of another memory access operation in the queue PS202B, i.e., another queue that corresponds to another plane set (i.e., plane set 202B).

In some embodiments, the processing logic can perform the memory access operation. In some embodiments, performing the memory access operation can be in response to retrieving the identifier of the memory access operation from the queue described at operation 420. Performing the memory access operation can include performing the memory access operation at the zone identified by the memory access operation request.

In some embodiments, the operations performed at operations 410 to 430 are performed using a hardware accelerator.

Figure 5:
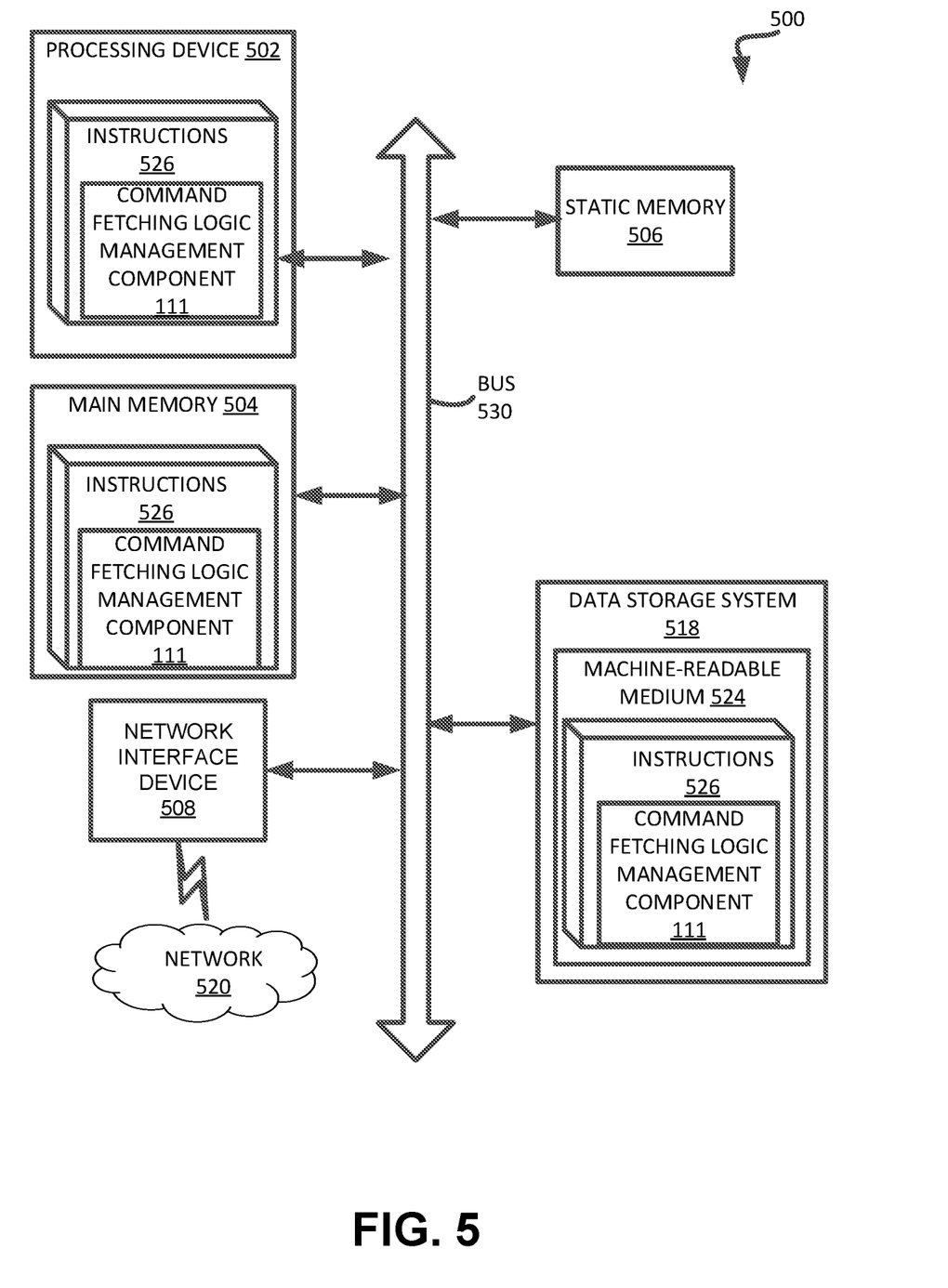
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the command fetching logic management component 111 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a command fetching logic management component (e.g., the command fetching logic management component 111 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device configured with a zoned namespace having a plurality of zones, wherein each zone is associated with a respective zone identifier; and
a processing device, operatively coupled with the memory device, to perform operations comprising:
storing a first identifier of a first memory access operation in a first queue of the memory device, wherein the first queue comprises one or more entries, wherein each entry stores an identifier of a memory access operation, and wherein the first memory access operation is to be performed at a first zone of the memory device;
identifying, among a plurality of plane sets of the memory device, a plane set that is associated, by a memory data structure, with the first zone of the memory device;
identifying a second queue of the memory device, wherein the second queue corresponds to the identified plane set, wherein the second queue comprises one or more entries, wherein each entry stores an identifier of a memory access operation to be performed at the first zone of the memory device;
responsive to determining that a number of identifiers of memory access operations stored in the second queue is greater than a threshold number of identifiers of memory access operations that can be stored in the second queue, retrieving a second identifier of a second memory access operation from the first queue, wherein the second memory access operation is to be performed at a second zone of the memory device;

storing the second identifier of the second memory access operation in a third queue of the memory device, wherein the third queue corresponds to a second plane set of the memory device, wherein the second plane set is associated with the second zone of the memory device; and performing the second memory access operation at the second zone of the memory device.

2. The system of claim 1, wherein the operations further comprise:

determining that the number of identifiers of memory access operations stored in the second queue is less than the threshold number of identifiers of memory access operations that can be stored in the second queue;

responsive to determining that the number of identifiers of memory access operations stored in the second queue is less than the threshold number of identifiers of memory access operations that can be stored in the second queue, retrieving the first identifier of the first memory access operation from the first queue; and storing the first identifier of the first memory access operation in the second queue.

3. The system of claim 1, wherein the operations further comprise:

receiving, from a host system, a request to perform the second memory access operation at the second zone of the memory device;

storing the second identifier of the second memory access operation in the first queue of the memory device;

identifying, among the plurality of plane sets of the memory device, the second plane set that is associated, by the memory data structure, with the second zone of the memory device;

determining that a number of identifiers of memory access operations stored in the third queue is less than the threshold number of identifiers of memory access operations that can be stored in the third queue;

responsive to determining that the number of identifiers of memory access operations stored in the third queue is less than the threshold number of identifiers of memory access operations that can be stored in the third queue, retrieving the second identifier of the second memory access operation from the first queue; and storing the second identifier of the second memory access operation in the third queue.

4. The system of claim 1, wherein the operations further comprise:

identifying a logical block address (LBA) associated with the first memory access operation; and determining, using the LBA, the respective zone identifier.

5. The system of claim 1, wherein the operations are performed by a hardware accelerator.

6. The system of claim 1, wherein each zone of the plurality of zones comprises a plurality of blocks residing on a plurality of planes of a die of the memory device.

7. A method comprising:

storing, by a controller managing a memory device, a first identifier of a first memory access operation in a first queue of the memory device, wherein the memory device is configured with a zoned namespace having a plurality of zones, wherein each zone is associated with a respective zone identifier, wherein the first queue comprises one or more entries, wherein each entry stores an identifier of a memory access operation;

identifying, among a plurality of plane sets of the memory device, a plane set that is associated, by a memory data structure, with a first zone of the memory device;

identifying a second queue of the memory device, wherein the second queue corresponds to the identified plane set, wherein the second queue comprises one or more entries, wherein each entry stores an identifier of a memory access operation to be performed at the first zone of the memory device;

responsive to determining that a number of identifiers of memory access operations stored in the second queue is greater than a threshold number of identifiers of memory access operations that can be stored in the second queue, retrieving a second identifier of a second memory access operation from the first queue, wherein the second memory access operation is to be performed at a second zone of the memory device; and storing the second identifier of the second memory access operation in a third queue of the memory device, wherein the third queue corresponds to a second plane set of the memory device, wherein the second plane set is associated with the second zone of the memory device; and performing the second memory access operation at the second zone of the memory device.

8. The method of claim 7, further comprising:

receiving, from a host system, a request to perform the first memory access operation at the first zone of the memory device.

9. The method of claim 7, further comprising:

determining that the number of identifiers of memory access operations stored in the second queue is less than the threshold number of identifiers of memory access operations that can be stored in the second queue;

responsive to determining that the number of identifiers of memory access operations stored in the second queue is less than the threshold number of identifiers of memory access operations that can be stored in the second queue, retrieving the first identifier of the first memory access operation from the first queue; and storing the first identifier of the first memory access operation in the second queue.

10. The method of claim 7, further comprising:

receiving, from a host system, a request to perform the second memory access operation at the second zone of the memory device;

storing the second identifier of the second memory access operation in the first queue of the memory device;

identifying, among the plurality of plane sets of the memory device, the second plane set that is associated, by the memory data structure, with the second zone of the memory device;

determining that a number of identifiers of memory access operations stored in the third queue is less than the threshold number of identifiers of memory access operations that can be stored in the third queue;

responsive to determining that the number of identifiers of memory access operations stored in the third queue is less than the threshold number of identifiers of memory access operations that can be stored in the third queue, retrieving the second identifier of the second memory access operation from the first queue; and storing the second identifier of the second memory access operation in the third queue.

11. The method of claim 7, further comprising:
identifying a logical block address (LBA) associated with the first memory access operation; and
determining, using the LBA, the respective zone identifier.

12. The method of claim 7, wherein the operations are performed by a hardware accelerator.

13. A non-transitory computer-readable storage medium comprising instructions that, when executed by a processing device, cause the processing device to perform operations comprising:
storing a first identifier of a first memory access operation in a first queue of a memory device, wherein the first queue comprises one or more entries, wherein each entry stores an identifier of a memory access operation, and wherein the first memory access operation is to be performed at a first zone of the memory device;
identifying, among a plurality of plane sets of the memory device, a plane set that is associated, by a memory data structure, with the first zone of the memory device;
identifying a second queue of the memory device, wherein the second queue corresponds to the identified plane set, wherein the second queue comprises one or more entries, wherein each entry stores an identifier of a memory access operation to be performed at the first zone of the memory device;
responsive to determining that a number of identifiers of memory access operations stored in the second queue is greater than a threshold number of identifiers of memory access operations that can be stored in the second queue, retrieving a second identifier of a second memory access operation from the first queue, wherein the second memory access operation is to be performed at a second zone of the memory device;
storing the second identifier of the second memory access operation in a third queue of the memory device, wherein the third queue corresponds to a second plane set of the memory device, wherein the second plane set is associated with the second zone of the memory device;
performing the second memory access operation at the second zone of the memory device.

14. The non-transitory computer-readable storage medium of claim 13, wherein the processing device is to perform operations further comprising:
determining that the number of identifiers of memory access operations stored in the second queue is less than the threshold number of identifiers of memory access operations that can be stored in the second queue;
responsive to determining that the number of identifiers of memory access operations stored in the second queue is less than the threshold number of identifiers of memory access operations that can be stored in the second queue, retrieving the first identifier of the first memory access operation from the first queue; and
storing the first identifier of the first memory access operation in the second queue.

15. The non-transitory computer-readable storage medium of claim 13, wherein the processing device is to perform operations further comprising:
receiving, from a host system, a request to perform the second memory access operation at the second zone of the memory device;
storing the second identifier of the second memory access operation in the first queue of the memory device;
identifying, among the plurality of plane sets of the memory device, the second plane set that is associated, by the memory data structure, with the second zone of the memory device;
determining that a number of identifiers of memory access operations stored in the third queue is less than the threshold number of identifiers of memory access operations that can be stored in the third queue;
responsive to determining that the number of identifiers of memory access operations stored in the third queue is less than the threshold number of identifiers of memory access operations that can be stored in the third queue, retrieving the second identifier of the second memory access operation from the first queue; and
storing the second identifier of the second memory access operation in the third queue.

16. The non-transitory computer-readable storage medium of claim 13, wherein the processing device is to perform operations further comprising:
identifying a logical block address (LBA) associated with the first memory access operation; and
determining, using the LBA, a respective zone identifier.

17. The non-transitory computer-readable storage medium of claim 13, wherein the operations are performed by a hardware accelerator.

18. The system of claim 1, wherein to determine that the number of identifiers of memory access operations stored in the second queue is greater than the threshold number of identifiers of memory access operations that can be stored in the second queue, the operations further comprise:
incrementing a counter for each entry in the second queue; and
identifying that the counter is less than a threshold value corresponding to a maximum number of identifiers of memory access operations that can be stored in the second queue.

19. The method of claim 7, wherein determining that the number of identifiers of memory access operations stored in the second queue is greater than the threshold number of identifiers of memory access operations that can be stored in the second queue comprises:
incrementing a counter for each entry in the second queue; and
identifying that the counter is less than a threshold value corresponding to a maximum number of identifiers of memory access operations that can be stored in the second queue.

20. The non-transitory computer-readable storage medium of claim 13, wherein to determine that the number of identifiers of memory access operations stored in the second queue is greater than the threshold number of identifiers of memory access operations that can be stored in the second queue, the processing device is to perform operations further comprising:
incrementing a counter for each entry in the second queue; and
identifying that the counter is less than a threshold value corresponding to a maximum number of identifiers of memory access operations that can be stored in the second queue.

* * * * *